(12) United States Patent
Haueter et al.

(10) Patent No.: US 11,292,096 B2
(45) Date of Patent: Apr. 5, 2022

(54) MACHINE TOOL

(71) Applicant: Liechti Engineering AG, Langnau im Emmental (CH)

(72) Inventors: Ernst Haueter, Bowil (CH); Christoph Urfer, Thun (CH); Andreas Scheidegger, Konolfingen (CH)

(73) Assignee: GF Machining Solutions AG

( * ) Notice: Subject to any disclaimer, the term of this patent is extended or adjusted under 35 U.S.C. 154(b) by 31 days.

(21) Appl. No.: 16/046,356

(22) Filed: Jul. 26, 2018

(65) Prior Publication Data

US 2019/0030666 A1 Jan. 31, 2019

(30) Foreign Application Priority Data

Jul. 27, 2017 (EP) .................................... 17183550

(51) Int. Cl.
    *B23Q 1/01* (2006.01)
    *B23Q 1/48* (2006.01)
    (Continued)

(52) U.S. Cl.
    CPC ........... *B23Q 1/015* (2013.01); *B23Q 1/4852* (2013.01); *B23Q 1/4857* (2013.01);
    (Continued)

(58) Field of Classification Search
    CPC .. B23Q 1/4852; B23Q 1/4857; B23Q 1/5443; B23Q 11/0825; B23Q 39/04; Y10T 409/305544; Y10T 409/3056; Y10T 409/305656; Y10T 409/305768; Y10T 409/305824; Y10T 409/30784; Y10T 409/307896; Y10T 409/307952; Y10T 409/308232; Y10T 409/308792;
    (Continued)

(56) References Cited

U.S. PATENT DOCUMENTS 3,009,398 A * 11/1961 Newton et al. ........ B23Q 35/18
                                                        409/119
3,379,286 A *  4/1968 Takagi ...................... F16F 9/50
                                                        188/272

(Continued)

FOREIGN PATENT DOCUMENTS

DE         10061934 B4 *  6/2005  .......... B23Q 1/4852
DE    10-2012-201736 B3     6/2013
(Continued)

*Primary Examiner* — Boyer D Ashley
*Assistant Examiner* — Michael Vitale
(74) *Attorney, Agent, or Firm* — Harness, Dickey & Pierce, P.L.C.

(57) ABSTRACT

The machine tool has a machine bed having a first horizontal linear guide and a second horizontal linear guide arranged at right angles to the first linear guide. On the first linear guide is arranged, in an axially displaceable manner, a workpiece clamping fixture, which is swivelable about a swivel axis oriented parallel to the second linear guide and is rotatable about a rotation axis oriented at right angles to the swivel axis. On the second linear guide a toque motor driven swivel arm is axially displaceable, the swivel axis of which is arranged parallel to the first linear guide and which on its free end bears a tool spindle, the axis of which is oriented parallel to the first linear guide.

12 Claims, 2 Drawing Sheets

(51) Int. Cl.
*B23Q 11/08* (2006.01)
*B23Q 3/157* (2006.01)
*B23Q 39/04* (2006.01)

(52) U.S. Cl.
CPC ...... *B23Q 3/15724* (2016.11); *B23Q 3/15766* (2013.01); *B23Q 11/0825* (2013.01); *B23Q 39/04* (2013.01); *B23Q 2210/004* (2013.01); *Y10T 409/305768* (2015.01); *Y10T 409/305824* (2015.01); *Y10T 409/307896* (2015.01); *Y10T 409/307952* (2015.01); *Y10T 483/1755* (2015.01); *Y10T 483/1891* (2015.01)

(58) Field of Classification Search
CPC ... Y10T 409/30896; Y10T 409/309016; Y10T 409/307672; Y10T 483/18; Y10T 483/1891
USPC ....... 409/163, 164, 165, 167, 168, 204, 205, 409/206, 211, 221, 224, 225, 201, 216; 483/66, 68
See application file for complete search history.

(56) References Cited

U.S. PATENT DOCUMENTS

| | | | | |
|---|---|---|---|---|
| RE26,393 E * | 5/1968 | Daugherty | ............ | B23Q 35/00 409/118 |
| 4,635,329 A * | 1/1987 | Holy | ........ | B23Q 1/52 29/27 C |
| 4,657,453 A * | 4/1987 | Goulot | ................ | B23Q 1/5412 409/211 |
| 4,984,351 A * | 1/1991 | Matsuyama | ............ | B23Q 1/03 29/33 P |
| 5,346,343 A * | 9/1994 | Babel | ........ | B23Q 1/48 409/201 |
| 5,560,415 A * | 10/1996 | Geissler | ............ | B23Q 11/0825 160/220 |
| 5,584,621 A * | 12/1996 | Bertsche | .............. | B23Q 1/5406 409/201 |
| 6,120,222 A * | 9/2000 | Hiramoto | ........... | B23Q 11/0042 409/134 |
| 6,454,636 B1 * | 9/2002 | Iwabuchi | ................ | B24B 57/02 451/450 |
| 7,318,693 B2 * | 1/2008 | Hansch | .................... | B23Q 1/44 408/236 |
| 7,909,550 B1 * | 3/2011 | Hsu | ...................... | B23Q 1/5406 409/201 |
| 8,523,500 B2 * | 9/2013 | Yamaura | ................ | B23Q 1/623 409/211 |
| 8,523,746 B2 * | 9/2013 | Haus | .................. | B23Q 3/15526 211/1.56 |
| 2001/0006595 A1 * | 7/2001 | Hogl | ........................ | B23Q 1/56 409/206 |
| 2002/0051687 A1 * | 5/2002 | Harami | ................ | B23Q 1/4857 409/134 |
| 2002/0114678 A1 * | 8/2002 | Klement | ................ | B23Q 5/28 409/201 |
| 2008/0078075 A1 * | 4/2008 | Schrott | ..................... | B23C 1/12 409/201 |
| 2008/0175684 A1 * | 7/2008 | Schmidt | ................. | B23Q 1/012 409/212 |
| 2009/0324145 A1 * | 12/2009 | Wardle | .................... | F16C 27/02 384/12 |
| 2010/0202848 A1 * | 8/2010 | Tanizaki | ................ | B23Q 1/015 409/134 |
| 2011/0162805 A1 * | 7/2011 | Cheng | ..................... | B25J 9/104 156/578 |
| 2013/0207331 A1 * | 8/2013 | Jung | ...................... | B23Q 1/017 269/57 |
| 2014/0187398 A1 * | 7/2014 | Abeln | ................ | B23Q 3/15706 483/1 |
| 2018/0104784 A1 * | 4/2018 | Suzuki | ................. | B23Q 11/121 |

FOREIGN PATENT DOCUMENTS

| | | | |
|---|---|---|---|
| EP | 1 002 621 A1 | 5/2000 | |
| EP | 1 595 639 A1 | 11/2005 | |
| EP | 2 602 052 A1 | 6/2013 | |
| GB | 2 202 769 A | 10/1988 | |
| JP | 2013163259 A * | 8/2013 | ......... B23Q 11/0825 |
| WO | WO-03-101663 A1 | 12/2003 | |

* cited by examiner

MACHINE TOOL

CROSS-REFERENCE TO RELATED APPLICATION

This application claims the benefit and priority of European Patent Application No. 17 183 550.7, filed Jul. 27, 2017, the entire disclosure of which is incorporated herein by reference.

BACKGROUND

Technical Field

The invention relates to a machine tool.

Related Art

Document EP1002621A1 shows a similarly constructed machine tool. The swivel motion of the swivel arm is in this machine produced by a spindle drive and a lever mechanism.

SUMMARY

Starting from this prior art, an aspect of the invention is to propose a machine tool which is of simpler construction and allows more rapid swivel motions of the swivel arm than the known machine.

This aspect is achieved according to the invention by the features described herein.

By virtue of the design according to the invention, the machine tool requires for the swivel motion of the swivel arm fewer moving parts and allows more rapid swivel motions than the known machine.

Particular embodiments of the invention are also described.

Another aspect of the invention relates to a swivel arm for a machine tool and achieves reduction of damping vibrations of the swivel arm which are caused, for instance, by the tool spindle disposed on its end.

BRIEF DESCRIPTION OF THE DRAWINGS

Illustrative embodiments of the invention are explained below with reference to the attached drawings, wherein.

DESCRIPTION OF EXEMPLARY EMBODIMENTS

Figure 1:
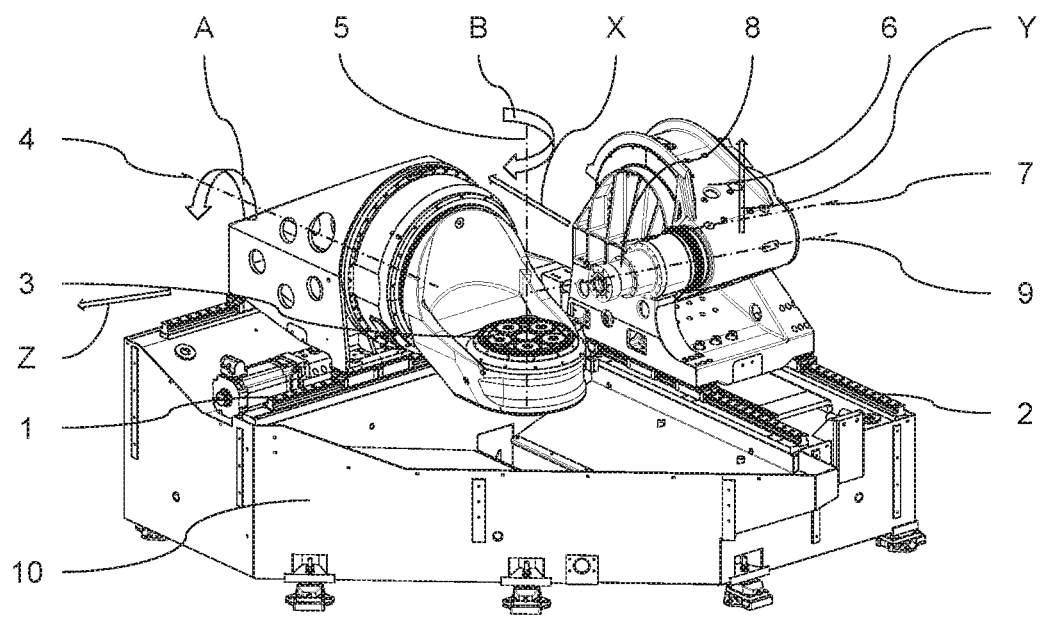
FIG. 1 shows a perspective view of a machine tool according to the invention.

FIG. 1 shows in a perspective view an illustrative embodiment of the machine tool according to the invention. This is particularly suitable for the machining of blade wheels for turbines, so-called "bladed discs", also referred to as "bliscs". On a machine bed 10 is arranged a first horizontal linear guide 1 and, at right angles thereto, a second horizontal linear guide 2. On the first linear guide 1, a workpiece clamping fixture 3 is arranged such that it is horizontally movable and is swivelable about a horizontal swivel axis 4. For the horizontal motion of the workpiece clamping fixture 3 on the first linear guide 1, a ball screw, for instance, is provided. Alternatively, the horizontal motion can be executed by means of a linear motor. Moreover, the workpiece clamping fixture 3 is rotatable about a rotation axis 5 oriented at right angles to its swivel axis 4. Disc-shaped blanks for blade wheels are supplied lying flat, for instance on pallets. The arrangement and design of the workpiece clamping fixture 3 allows these blanks to be clamped without being tilted, which is particularly advantageous in the case of large and heavy blanks.

On the second linear guide 2, a swivel arm 6 is arranged such that it is horizontally movable and is swivelable about a horizontal swivel axis 7, on the free end of which swivel arm is arranged a tool spindle 8. The horizontal motions of the swivel arm 6 on the second linear guide 2 are preferably executed by a linear motor. The axis 9 of the tool spindle is oriented parallel to the swivel axis 7. The machine tool according to the invention is thus a five-axis machine having the translatory axes X, Y and Z and the rotatory axes A and B. A particularity is here that, for a pure displacement of the tool along the Y-axis, a combined circular motion of the tool spindle 8 and linear motion of the swivel axis 7 along the linear guide 2 is necessary.

A particular advantage of this construction consists in the fact that the center of gravity of the entire unit which is movable on the second linear guide 2 is located vertically only a little above the second linear guide 2 and moves only a little upwards when the tool spindle 8 is transported into its uppermost position. This in contrast to machine tools of different construction, such as, for instance, the machine according to EP1509360, in which a tool spindle is likewise disposed on a swivel arm, wherein, however, the swivel arm is raised, together with its swivel drive, along a vertical linear guide in order to bring the tool spindle into an upper position. A high center of gravity promotes the occurrence of undesirable vibrations. The direct driving of the swivel arm 6 by a torque motor disposed on the swivel axis 7 allows rapid and precise motions of the tool spindle 8.

Figure 2:
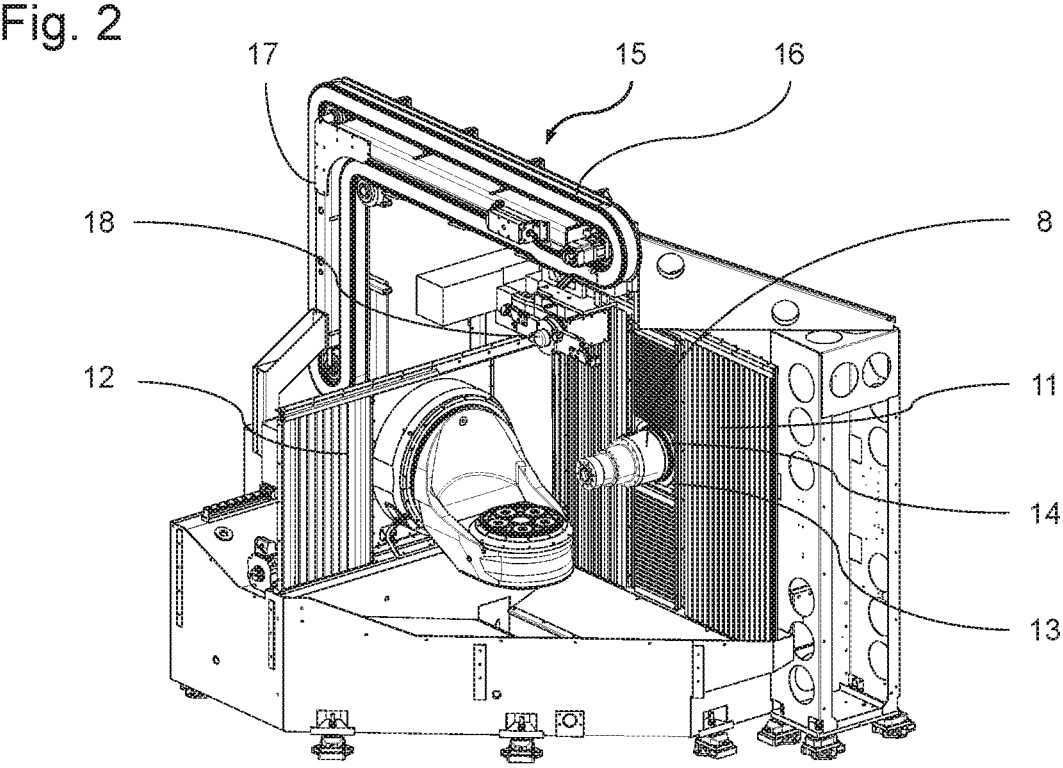
FIG. 2 shows a similar view to FIG. 1 with X-Y protective walls and a tool-holding chain magazine.

FIG. 2 shows the same machine as FIG. 1, yet with additional sub-assemblies, of which two are described in greater detail below. Two X-Y protective covers 11 and 12 separate the working space from the other regions of the machine tool, in particular the linear guides 1 and 2, in order to keep chips, and also coolant and lubricant, in the working space. These X-Y protective covers can be of known construction, having a driving plate 13 and plate fins operatively connected thereto, for instance as described in EP19861324A1. In the machine according to the invention, having the swivel arm 6, the problem now exists that that part of the tool spindle 8 which passes through the driving plate 13, with the swiveling of the swivel arm 6, inevitably in the driving plate 13 executes a rotary motion. Therefore the tool spindle 8 cannot be connected directly to the driving plate 8, but rather with the interposition of a pivot bearing 14.

A further sub-assembly, which is visible in FIG. 2, is a tool-holding chain magazine 15, which is of angular or arcuate configuration and is configured such that a limb 16 ends with an at least approximately horizontally oriented end in the top of the work region, and a limb 17 ends with an at least approximately vertically oriented end in a region, facing away from the working area, behind the first linear guide. On the end region of the limb 16 is arranged a tool changer 18, which is reachable by the tool spindle 8 along a short path. The end region of the limb 17 is configured for the loading and emptying of the tool-holding chain magazine 15 and is easily reachable by an operator.

Figure 3:
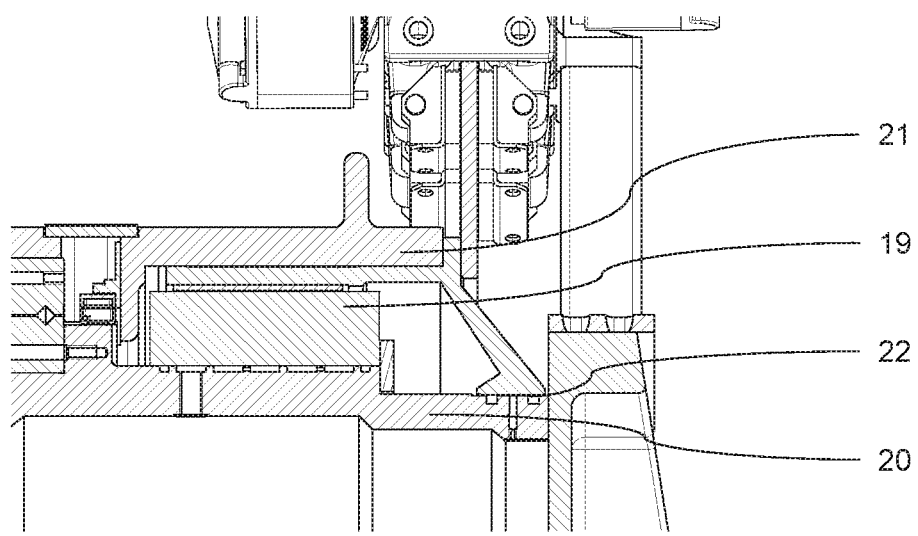
FIG. 3 shows a sectional view of the mounting and of the drive mechanism of the swivel arm.

FIG. 3 shows in a sectioned view a detail of the mounting of the swivel arm 6. The latter is driven in the present example by means of an external-rotor torque motor. A torque motor stator denoted by 19 has a stator part 20 connected in a rotationally secure manner thereto. A torque motor rotor 21 is additionally supported on the stator part 20 by an oil-lubricated slide bearing 22. The slide bearing 22 has, by virtue of its oil film, a vibration-damping effect (squeeze film damping).

What is claimed is:

1. A machine tool comprising:
    a machine bed having a first horizontal linear guide and a second horizontal linear guide, a longitudinal axis of the second horizontal linear guide being arranged at a right angle to a longitudinal axis of the first horizontal linear guide;
    a workpiece clamping fixture arranged on the first horizontal linear guide in an axially displaceable manner, the workpiece clamping fixture is swivelable about a first swivel axis oriented parallel to the longitudinal axis of the second horizontal linear guide and is rotatable about a rotation axis oriented at a right angle to the first swivel axis;
    a swivel arm axially displaceable on the second horizontal linear guide, a second swivel axis of the swivel arm is arranged parallel to the longitudinal axis of the first horizontal linear guide;
    a tool spindle on a free end of the swivel arm, a spindle axis of the tool spindle is oriented parallel to the longitudinal axis of the first horizontal linear guide; and
    a torque motor having a rotor and a stator disposed on the second swivel axis of the swivel arm, the torque motor being configured to swivel the swivel arm about the second swivel axis;
    a linear motor configured to move the swivel arm linearly along the second horizontal linear guide;
    wherein the second swivel axis of the swivel arm is always in parallel to the spindle axis of the tool spindle;
    wherein the swivel arm is configured to vertically move the tool spindle; and
    wherein the linear motor and the torque motor are configured to simultaneously move to provide a combined circular motion of the second swivel axis and linear motion of the second swivel axis along the second horizontal linear guide.

2. The machine tool according to claim 1 wherein, for the swivel motion and the rotary motion of the workpiece clamping fixture, an additional torque motor is respectively present.

3. The machine tool according to claim 1 wherein on a side of the second horizontal linear guide facing the workpiece clamping fixture is arranged an X-Y protective cover having a driving plate in which is accommodated a pivot bearing surrounding a tool-side end of the tool spindle.

4. The machine tool according to claim 1 wherein on a side of the second horizontal linear guide facing towards the workpiece clamping fixture is arranged an angular or arcuate tool-holding chain magazine having an approximately horizontally arranged limb and an approximately vertically arranged limb, and at a free end of the approximately horizontal limb is arranged a tool changer.

5. The machine tool according to claim 1, further comprising:
    a slide bearing extending between the stator and the rotor in a direction parallel to the second swivel axis and extending around the torque motor, the slide bearing configured to provide oil damping.

6. The machine tool according to claim 5, wherein the rotor is an external rotor and the stator is an internal stator.

7. The machine tool according to claim 1, wherein the second swivel axis of the swivel arm is offset from the spindle axis of the tool spindle.

8. A machine tool comprising:
    a machine bed having a first horizontal linear guide and a second horizontal linear guide, a longitudinal axis of the second horizontal linear guide being arranged at a right angle to a longitudinal axis of the first horizontal linear guide;
    a workpiece clamping fixture arranged on the first horizontal linear guide in an axially displaceable manner, the workpiece clamping fixture is swivelable about a first swivel axis oriented parallel to the longitudinal axis of the second horizontal linear guide and is rotatable about a rotation axis oriented at a right angle to the first swivel axis;
    a swivel arm axially displaceable on the second horizontal linear guide, a second swivel axis of the swivel arm is arranged parallel to the longitudinal axis of the first horizontal linear guide;
    a tool spindle on a free end of the swivel arm, an axis of rotation of the tool spindle is oriented parallel to the longitudinal axis of the first horizontal linear guide, the axis of rotation of the tool spindle extends parallel to the second swivel axis of the swivel arm, and the swivel arm rotates about the second swivel axis to position the tool spindle; and
    a torque motor including a stator and a rotor, the torque motor is disposed on the second swivel axis of the swivel arm and is configured to swivel the swivel arm about the second swivel axis to position the tool spindle;
    wherein the second swivel axis of the swivel arm is offset from the axis of rotation of the tool spindle;
    wherein the second swivel axis of the swivel arm is always in parallel to the axis of rotation of the tool spindle; and
    wherein a linear motor and the torque motor are configured to simultaneously move to provide a combined circular motion of the second swivel axis and linear motion of the second swivel axis along the second horizontal linear guide.

9. The machine tool of claim 8, wherein the rotor is an external rotor and the stator is an internal stator.

10. The machine tool of claim 8, further comprising a slide bearing extending between the stator and the rotor in a direction parallel to the second swivel axis and extending around the torque motor.

11. The machine tool of claim 10, wherein the slide bearing is configured to provide oil damping.

12. A machine tool comprising:
    a machine bed having a first horizontal linear guide and a second horizontal linear guide, a longitudinal axis of the second horizontal linear guide being arranged at a right angle to a longitudinal axis of the first horizontal linear guide;
    a workpiece clamping fixture arranged on the first horizontal linear guide in an axially displaceable manner, the workpiece clamping fixture is swivelable about a first swivel axis oriented parallel to the longitudinal axis of the second horizontal linear guide and is rotatable about a rotation axis oriented at a right angle to the first swivel axis;
    a swivel arm axially displaceable on the second horizontal linear guide by a linear motor, a second swivel axis of the swivel arm is arranged parallel to the longitudinal axis of the first horizontal linear guide;

a tool spindle on a free end of the swivel arm, an axis of rotation of the tool spindle is oriented parallel to the longitudinal axis of the first horizontal linear guide, the axis of rotation of the tool spindle extends parallel to the second swivel axis of the swivel arm, and the swivel arm rotates about the second swivel axis to position the tool spindle; and a torque motor including a stator and a rotor, the torque motor is disposed on the second swivel axis of the swivel arm and is configured to swivel the swivel arm about the second swivel axis to position the tool spindle;

wherein the second swivel axis of the swivel arm is offset from the axis of rotation of the tool spindle; and wherein the linear motor and the torque motor are configured to simultaneously move to provide a combined circular motion of the second swivel axis and linear motion of the second swivel axis along the second horizontal linear guide.

* * * * *